(12) United States Patent
Miller

(10) Patent No.: US 7,496,779 B2
(45) Date of Patent: Feb. 24, 2009

(54) DYNAMICALLY SYNCHRONIZING A PROCESSOR CLOCK WITH THE LEADING EDGE OF A BUS CLOCK

(75) Inventor: William V. Miller, Arlington, TX (US)

(73) Assignee: Via Technologies, Inc., Hsin-Tien Taipei (TW)

( * ) Notice: Subject to any disclaimer, the term of this patent is extended or adjusted under 35 U.S.C. 154(b) by 487 days.

(21) Appl. No.: 11/451,806

(22) Filed: Jun. 13, 2006

(65) Prior Publication Data

US 2007/0288786 A1    Dec. 13, 2007

(51) Int. Cl.
G06F 1/04 (2006.01)
(52) U.S. Cl. ................................. 713/500; 713/502
(58) Field of Classification Search ............. 713/500, 713/502
See application file for complete search history.

(56) References Cited

U.S. PATENT DOCUMENTS 5,729,719 A * 3/1998 Gates .......................... 713/400
6,194,927 B1 * 2/2001 Crowley et al. ............. 327/147
7,047,433 B2 * 5/2006 Lin ............................. 713/400

* cited by examiner

*Primary Examiner*—Nitin C Patel
(74) *Attorney, Agent, or Firm*—Thomas, Kayden, Horstemeyer & Risley (57) ABSTRACT

Systems and methods for detecting a leading edge of a bus clock signal are disclosed herein. One edge detecting system includes a device for providing a bus clock and a processor clock, in which the processor clock is an integer multiple of the bus clock. The device for providing the clocks, however, does not provide a control signal that indicates the location of an edge of the bus clock. The system further includes a clock tree configured to distribute the bus clock and processor clock to multiple destinations, whereby the destinations receive the bus clock and processor clock delayed by an insertion time of the clock tree. The system also includes a processor having a device for detecting the leading edge of the bus clock delayed by the insertion time. Furthermore, a method is disclosed herein. The method includes generating a bus clock and a processor clock without a corresponding control signal, receiving an insertion-delayed version of the bus clock and processor clock, and processing the insertion-delayed bus clock and processor clock to generate a flag signal that indicates the location of a leading edge of the insertion-delayed bus clock.

20 Claims, 8 Drawing Sheets

DYNAMICALLY SYNCHRONIZING A PROCESSOR CLOCK WITH THE LEADING EDGE OF A BUS CLOCK

TECHNICAL FIELD

The present disclosure generally relates to processors, or microprocessors, residing within computer systems or system-on-chip (SOC) devices. More particularly, the present disclosure relates to circuitry associated with a processor for detecting the leading edge of a bus clock to dynamically synchronize a higher-frequency processor clock with a lower-frequency bus clock.

BACKGROUND

Computer systems are often advertised according to various characteristics of the processor, particularly the internal clock frequency of the processor. Typically, the processor clock has a frequency that is an integer multiple of the bus clock frequency. Although a processor is usually capable of performing internal operations at the advertised fast clock speeds, in many cases the processor clock is too fast for the bus and peripheral devices. Therefore, the processor communicates with the peripheral devices only at the slower speed of the interface bus clock. Even in a system-on-chip (SOC) device, the processor is limited to the slower clock frequency during data transfers.

From a timing perspective, the difference between frequencies can cause problems if the processor is not informed of the timing characteristics of the slower bus clock. Assume, for example, that a processor clock is running at a speed of four times the speed of a bus clock. In this case, the processor would be capable of transferring data at any one of the four active edges during the one clock cycle of the bus clock. However, the bus would expect to begin communications when the processor clock and bus clock are synchronized, or, in other words, when their active or leading edges are aligned. To utilize the entire bus clock cycle, the processor should begin data transmissions at the start of the bus clock cycle. If this relationship between clock cycles is not taken into account, then timing issues for other peripheral devices communicating on the bus can arise, thereby slowing down the operation of the computer system. Therefore, it is desirable for the processor to transfer information in synchronization with the leading edge of the bus clock.

To handle the timing of the processor clock with respect to the bus clock, the processor must know the location of the leading edge of the bus clock in order to synchronize to this edge. One conventional solution has been to determine the ratio between the bus clock and the processor clock during power up. Then, this ratio is maintained during operation from that point forward. A problem with this methodology is that the computer system is confined to this single clock ratio. The clocks cannot be adjusted dynamically as necessary in order to reduce power or enhance performance.

Another solution for synchronizing a processor clock to a bus clock has been to provide a phased locked loop (PLL) device in the processor to constantly resynchronize the processor clock to the bus clock. The PLL device receives a low frequency signal, which is used for the bus clock. From the low frequency signal, the PLL device generates a higher frequency signal, which is used for the processor clock. The downside of PLL devices is that it is difficult to design a PLL circuit effectively in this configuration. Also, PLL devices are expensive and take up a relatively large area on the silicon chip.

Figure 1:
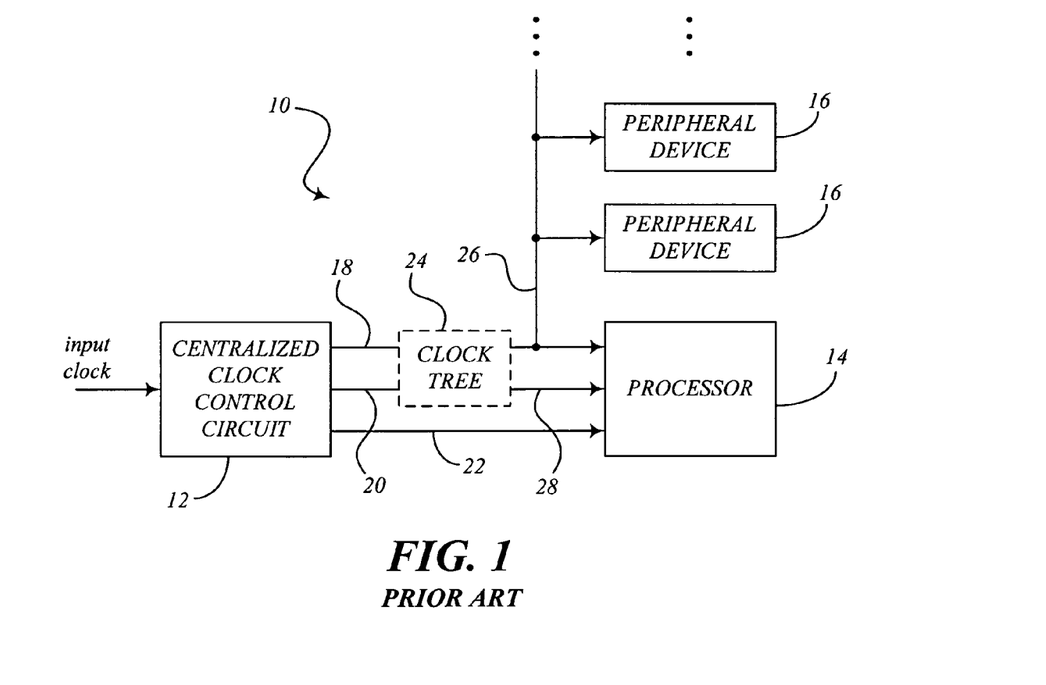
FIG. 1 is a block diagram of a conventional clocking system for generating, distributing, and synchronizing clock signals.

A third solution to locating the edge of the bus clock has been to provide a centralized clock control circuit. FIG. 1 is a block diagram of a clocking system 10, such as one that may be configured on a system-on-chip (SOC) device. The clocking system 10 includes a centralized clock control circuit 12 for generating a processor clock intended for a processor 14 and a bus clock intended for peripheral devices 16. The bus clock is supplied along path 18 and the processor clock is supplied along path 20. The centralized clock control circuit 12 also provides a control signal along path 22. The control signal is configured to indicate which clock edge of the processor clock is associated with the next rising edge of the bus clock.

In reality, the bus clock and processor clock are distributed to thousands of destinations. Since it would be impractical to design a single driver to drive this large number of elements, an industry standard clock tree insertion tool is used to create a clock tree 24. The clock tree 24 includes several branches, and smaller branches branching from the larger branches, and so on, branching out to thousands of flip-flops (not shown) or other sequential elements having clock inputs driven by the clock signals. Each branch includes one or more buffers for properly driving the clock signals to the flip-flops, or "leaves" of the clock tree.

The buffers, however, inherently cause a delay from the centralized clock control circuit 12 to the flip-flops. Therefore, the clock tree 24 is also designed to balance the delays of the bus clock and processor clock from the centralized clock control circuit 12 to the destination devices. This delay is referred to as the "insertion time". The bus clock supplied along path 18 reaches the leaf level of the clock tree 24 along path 26, which carries the insertion-delayed bus clock signal. Also, the insertion-delayed processor signal is carried along path 28.

The problem with this technique, however, is that the clock tree insertion tool for inserting the branches and buffers typically cannot manage to create a similar delay structure for the control signal along path 22. If there is a skew in the phase of the control signal with respect to the processor clock and bus clock at the leaves of the clock tree, then the control signal will not properly indicate the start of the bus clock cycle as intended. Normally, the control signal typically experiences fewer delays. Thus, after running the insertion tool, a chip designer must manually insert delay elements in the layout to match the control signal with the clocks. The problem with this technique is that this modification to the layout can be difficult and time-consuming. Also, manual adjustments are subject to human error, which is typically greater than the error of automated insertion tools.

Figure 2:
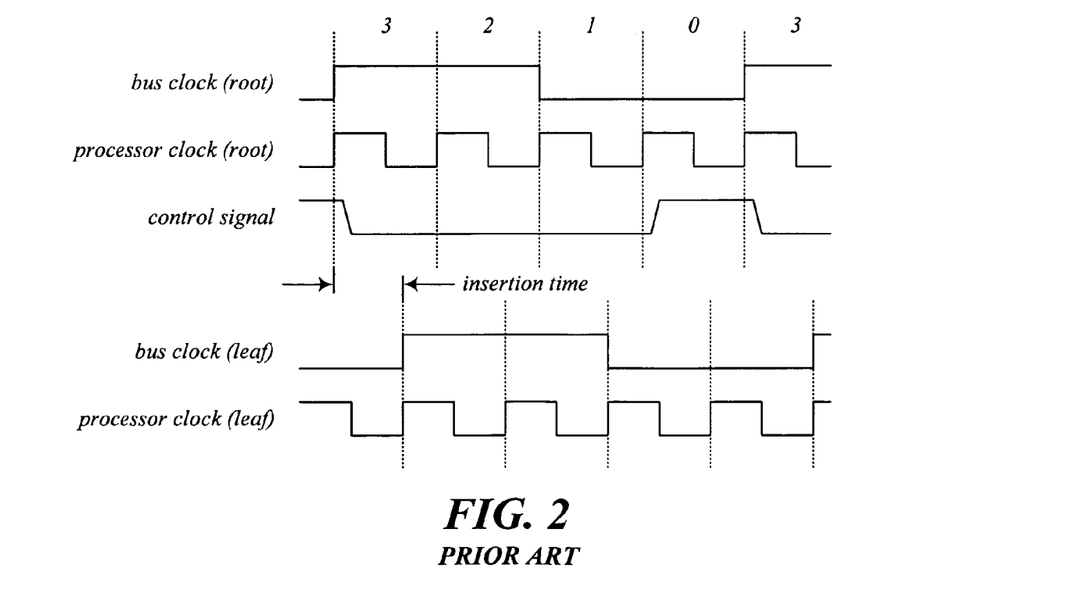
FIG. 2 is a timing diagram of sample signals generated in FIG. 1.

FIG. 2 is a timing diagram showing the timing of the signals in FIG. 1. The first three signals are the bus clock, processor clock, and control signal, each generated by the centralized clock control circuit 12 at the root of the clock tree 24. In this example, the frequency of the processor clock is four times greater than the bus clock. The centralized clock control circuit 12 may count down the cycles of the processor clock with respect to one cycle of the bus clock, e.g. from 3 to 0 in this example. The bus clock pulse is high on the 3 and 2 counts and is low on the 1 and 0 counts. On cycle 0 of the processor clock, the control signal is generated to indicate the start of the new bus clock cycle. The control signal then goes low fairly quickly after the start of the new bus clock.

FIG. 2 also includes fourth and fifth timing signals showing the bus clock and processor clock delayed by the insertion time. These clocks are seen by the flip-flops at the leaves of the clock tree 24. A downside of this prior art technique using the centralized clock control circuit 12 is that the control signal can be skewed from the bus clock and processor clock at the leaves and fail to properly synchronize the clocks. As mentioned above, manual adjustments must be made to deskew the control signal.

Thus, a need exists in the industry to address the aforementioned deficiencies and inadequacies of the prior art. More specifically, a need exists to provide a circuit that requires less design effort to deskew the control signal, eliminates the element of human error, and operates more effectively for synchronizing the processor clock with the bus clock.

SUMMARY

To overcome the deficiencies of the prior art, the present application describes circuitry and methods for detecting the leading edge of a bus clock. With knowledge of the leading edge of the bus clock, it is possible to synchronize the processor clock with the bus clock. In one embodiment, among others, a circuit is described herein for indicating the location of a leading edge of a bus clock. The circuit comprises a previous edge detector for detecting a leading edge of a previous bus clock cycle. The previous edge detector is configured to receive a bus clock and a processor clock at a leaf of a clock tree. The previous edge detector is further configured to generate a "previous_edge" signal. The circuit further comprises a clock ratio controller configured to generate a "clock_ratio" signal indicating the ratio of the frequency of the processor clock to the frequency of the bus clock. The frequency of the processor clock is preferably an integer multiple of the frequency of the bus clock. The circuit further comprises combinational logic configured to receive the clock_ratio signal and further configured to generate a new_clock_count signal. The circuit further comprises a clock counter configured to receive the processor clock, the previous_edge signal, the clock_ratio signal, and the new_clock_count signal, and further configured to generate a clk_count signal. The circuit also includes a flag generating circuit configured to process the clk_count signal and generate a clk_edge_flag signal indicative of the location of the leading edge of the next bus clock cycle.

In another exemplary embodiment, circuitry described in the present disclosure includes a device for providing a bus clock and a processor clock, in which the processor clock is an integer multiple of the bus clock. In this case, the device does not provide, along with the clock signals, a control signal that indicates the location of an edge of the bus clock. The circuitry also includes a clock tree configured to distribute the bus clock and processor clock to multiple destinations, whereby the destinations receive the bus clock and processor clock delayed by an insertion time of the clock tree. The circuitry also includes a processor having a device for locally detecting the leading edge of the bus clock delayed by the insertion time.

In another example, a method, among others, is discussed for detecting the leading edge of the bus clock. The method includes generating a bus clock and a processor clock without a corresponding control signal. The method also includes receiving an insertion-delayed version of the bus clock and processor clock and processing the insertion-delayed bus clock and processor clock to generate a flag signal that indicates the location of a leading edge of the insertion-delayed bus clock.

Other systems, methods, features, and advantages of the present disclosure will be apparent to one having skill in the art upon examination of the following drawings and detailed description. It is intended that all such additional systems, methods, features, and advantages be included within this description and protected by the accompanying claims.

BRIEF DESCRIPTION OF THE DRAWINGS

Many aspects of the embodiments disclosed herein can be better understood with reference to the following drawings. Like reference numerals designate corresponding parts throughout the several views.

DETAILED DESCRIPTION

The control signal in the prior art is generated at the centralized clock control circuit and may be skewed with respect to insertion-delayed bus clock and processor clock signals. This can cause timing issues that require a chip designer to manually design delay circuits for deskewing the control signal. The logic associated with the present application creates a flag signal, which is similar to an ideal control signal.

The flag signal, however, is generated locally within the processor by processing the leaf clocks. As a result, there is no "root" control signal and therefore no need to manually delay the root control signal to create a synchronized "leaf" control signal. The logic associated herein is generated using standard design and synthesis approaches and as a result its generation flows through the standard design tool sequence and requires no manually human intervention, thus taking less design time and lowering the risk of error. Like the ideal control signal, the locally generated flag signal described herein locates the start of a new bus clock cycle to synchronize the processor clock to the bus clock. In this way, the clocks can be synchronized regardless of the delay in the clock tree with respect to the control signal delay. Furthermore, even if the clock ratio between the bus clock and the processor clock changes during operation, the circuitry of the present application is capable of re-synchronizing on the fly.

It is known in the art that processor circuitry may be configured to be responsive to either the rising edge or falling edge of a clock signal. Typically, the rising edge of the clock signals is used as the leading, or active, edge. Therefore, for simplicity, the present application uses examples where the rising edges of the clocks are the active edges. However, it should be pointed out, in this respect, that minor modifications to the circuitry can be made as is known in the art in order to enable operation with rising edge or falling edge systems.

Figure 3:
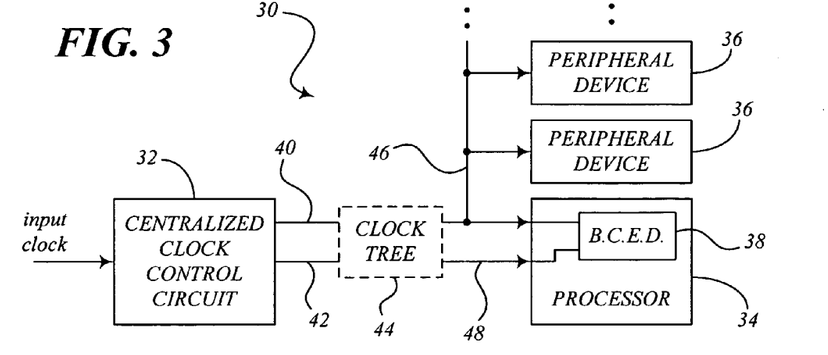
FIG. 3 is a block diagram of an embodiment of a clocking system according to the teachings of the present disclosure.

FIG. 3 is a block diagram of an embodiment of a clocking system 30 according to the present disclosure. The clocking system 30 includes a centralized clock control circuit 32, a processor 34, and peripheral devices 36. The processor 34 includes, among other components, a bus clock edge detector 38 as is described in detail below. The centralized clock control circuit 32, which may contain hardware and/or software, generates a bus clock along path 40 and a processor clock along path 42, whereby the processor clock has a frequency that is an integer multiple of the bus clock. An industrial standard tool can be used to insert a clock tree 44, which is designed with buffers to drive the clock signals to the plurality of destination devices running off the clocks. The clock tree 44 is also designed to balance the clock delays in such a way that both clocks will encounter the same insertion delay time. At the leaf level of the clock tree 44, the delayed bus clock signal is simply referred to herein as "bus_clk" and the delayed processor clock signal is simply referred to herein as "processor_clk". The insertion-delayed bus_clk signal is present, for example, on path 46 and processor_clk is present, for example, on path 48.

In contrast to the prior art, the centralized clock control circuit 32 does not generate a control signal. In this embodiment, and other alternative embodiments that may be contemplated within the spirit and scope of the present application, a root control signal is either not generated or disregarded. In place of the control signal, a flag signal is created locally by the bus clock edge detector 38 of the processor 34. Particularly, the bus clock edge detector 38 receives bus_clk and processor_clk and processes these leaf clock signals to create the flag signal, which indicates the location of the leading edge of the next bus clock. Knowing the location of the bus clock edge, the processor clock can be synchronized with the bus clock to more efficiently perform data communication functions.

Figure 4:
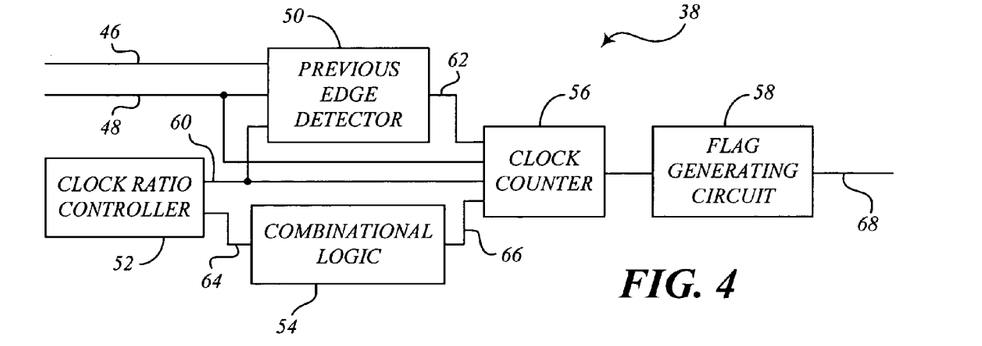
FIG. 4 is a block diagram of an embodiment of the bus clock edge detector shown in FIG. 3.

FIG. 4 is a block diagram of an embodiment of the bus clock edge detector 38 shown in FIG. 3. The bus clock edge detector 38 of this embodiment includes a previous edge detector 50, a clock ratio controller 52, combinational logic 54, a clock counter 56, and a flag generating circuit 58. The root clocks, which traverse from the centralized clock control circuit 32 through the clock tree 44, are received by the previous edge detector 50 along paths 46 and 48. The clock ratio controller 52 provides a "valid_ratio" signal along path 60 indicating whether or not the ratio of frequencies between the processor clock and the bus clock is 1:1. If the ratio is 1:1, the valid_ratio signal will be logic 0, but if the ratio is 2:1 or greater, then valid_ratio will be logic 1.

The previous edge detector 50 receives bus_clk from path 46, processor_clk from path 48, and the valid_ratio signal from path 60. When valid_ratio is high, indicating not a 1:1 ratio, then the previous edge detector 50 detects the leading edge at the start of a previous bus clock cycle. Actually, the previous edge detector 50 detects the first non-active edge of the processor clock after the start of synchronized bus clock and processor clock signals. In other words, the previous edge detector 50 finds an intermediate point along the first phase of the bus clock cycle where the higher-frequency processor clock first changes states. Thus, the previous edge detector 50 can avoid sampling at the edge of the clocks, which would provide an unknown state (logic 0 or 1). After processing these signals, the previous edge detector 50 provides a "previous_edge" signal along path 62 to the clock counter 56. The function of the previous edge detector 50 will become more apparent with an understanding of the detailed description of this device with respect to FIG. 5 below.

In addition to producing the valid_ratio signal along path 60, the clock ratio controller 52 also produces a "clock_ratio" signal along path 64 to the combinational logic 54. The clock_ratio signal includes a code value that designates the integer ratio between the clocks, or, in other words, the "divide by" value used to create the bus clock signal from the higher frequency processor clock signal. The combinational logic 54 is configured to receive the clock_ratio signal along path 64 from the clock ratio controller 52 and decode the signal to produce a "new_clk_count" signal along path 66 according to the truth table below:

| clock_ratio (along path 64) | new_clk_count (along path 66) |
|---|---|
| 000 (divide by 8) | 110 |
| 001 (divide by 1) | 000 |
| 010 (divide by 2) | 000 |
| 011 (divide by 3) | 001 |
| 100 (divide by 4) | 010 |
| 101 (divide by 5) | 011 |
| 110 (divide by 6) | 100 |
| 111 (divide by 7) | 101 |

The clock counter 56 receives the processor_clk signal along path 48, the previous_edge signal along path 62 from the previous edge detector 50, the valid_ratio signal along path 60 from the clock ratio controller 52, and the new_clk_count signal along path 66 from the combinational logic 54. The clock counter 56 processes these signals to produce a count signal that is provided to the flag generating circuit 58. From the count, the flag generating circuit 58 generates a flag signal along path 68 that indicates the start of the next bus clock cycle. A more detailed description of the function of the clock counter 56 is described below with reference to the embodiment of FIG. 10.

Figure 5:
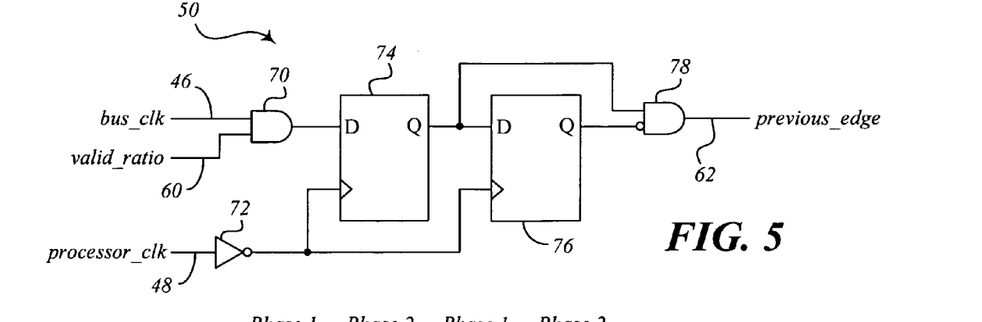
FIG. 5 is a schematic diagram of an embodiment of the previous edge detector shown in FIG. 4.

FIG. 5 is a schematic diagram of an embodiment of the previous edge detector 50 shown in FIG. 4. This embodiment includes a first AND gate 70, an inverter 72, a first flip-flop 74, a second flip-flop 76, and a second AND gate 78. The first AND gate 70 is configured to receive the bus_clk signal and the valid_ratio signal. As mentioned above, the valid_ratio signal will be logic 0 when the ratio between clock frequencies is 1:1. In this respect, the previous edge detector 50 will provide a continuous 0 output along path 62 for the previous_edge signal, which signifies that there is no intermediate point along the first phase of the bus clock where the processor clock changes states. In this case, the previous edge detector 50 will essentially be turned off. If, on the other hand, valid_ratio is high, indicating that the clock ratios are 2:1 or greater, then the previous edge detector 50 will be validated and operate in a normal fashion.

When valid_ratio and bus_clk are both high, the first AND gate 70 outputs a logic 1 value to the D input of the first flip-flop 74. The inverter 72 inverts the processor clock signal such that the flip-flops 74 and 76 will be clocked on the non-active edge of the processor clock. Since the leading edges of both the bus_clk and processor_clk signals correspond to rising edges in these examples, the flip-flops will be clocked on the processor clock's falling edge. Of course, for an alternative embodiment where the processor clock is falling edge active, the inverter 72 may be omitted. One of ordinary skill in the art will be capable of making other necessary modifications to this or other circuitry, if desired, to handle falling edge-dependent configurations without departing from the spirit and scope of the present application.

The next time the flip-flops are clocked, the previous state of the first flip-flop 74 is shifted to the D input of the second flip-flop 76. Thus, the second flip-flop 76 holds the previous state of the bus clock. The second flip-flop 76 outputs the bus clock's previous state to the inverted input of the second AND gate 78 and the first flip-flop 74 outputs the bus clock's current state to the non-inverted input of the second AND gate 78. When the previous state is 0 and the current state is 1, which is indicative of a transition of a rising edge of the bus clock, then the AND gate 78 produces a high output as the previous_edge signal along path 62. Therefore, the previous edge detector 50 detects the previous rising edge of the bus clock when both clocks are rising edge leading. Actually, since the start of the processor clock cycle and bus clock cycle are initially synchronized and the flip-flops are clocked on the non-active edge of the processor clock at an intermediate point along the first phase of the bus clock to avoid sampling on the edge, the output of the previous edge detector 50 provides a signal delayed a half cycle of the processor clock after the start of the previous bus clock cycle. Knowing that the clock ratio is at least 2:1 by the valid_ratio signal, the processor clock will transition (from logic 1 to 0 in this example) while the bus clock is still high.

Figure 6:
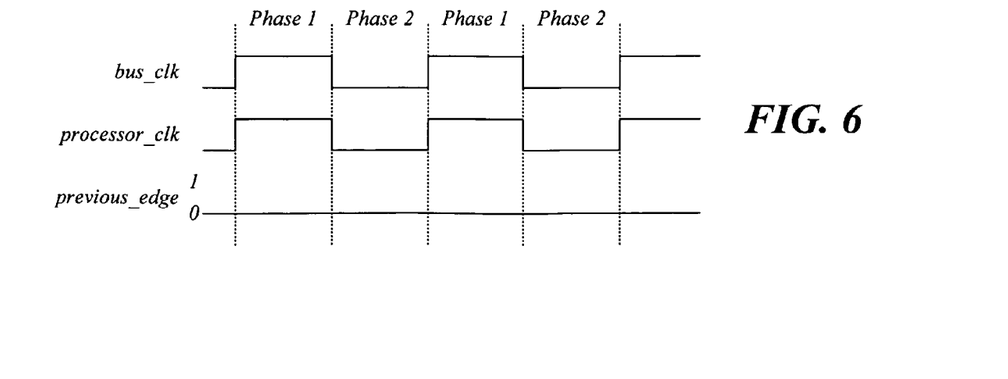
FIG. 6 is a timing diagram of exemplary signals present in the embodiment of FIG. 5 for a core-to-bus frequency ratio of 1:1.

FIG. 6 is a timing diagram of exemplary signals processed by or output from the previous edge detector 50 of FIG. 5. This diagram illustrates the case when the ratio between the processor clock and bus clock is 1:1. Since the valid_ratio signal will be logic 0 in this situation, AND gate 70 continuously outputs 0, which is clocked through the flip-flops. A logic 0 at one of the inputs of the AND gate 78 produces a continuous logic 0 value for the previous_edge signal.

Figure 7:
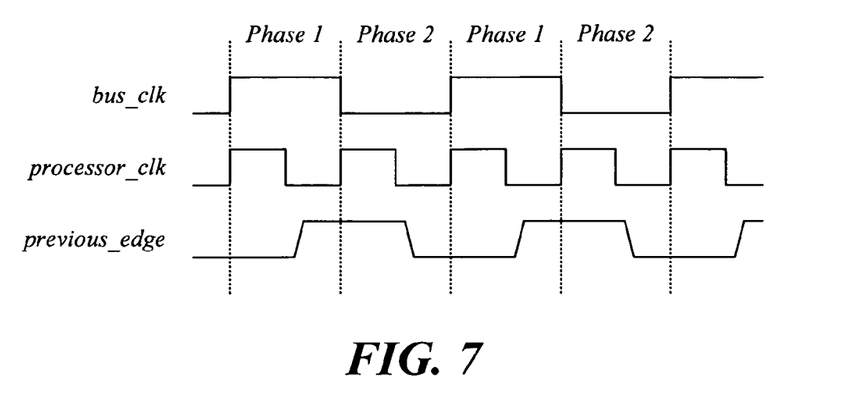
FIG. 7 is a timing diagram of exemplary signals present in the embodiment of FIG. 5 for a core-to-bus frequency ratio of 2:1.

FIG. 7 is a timing diagram of exemplary signals processed by or output from the previous edge detector 50 of FIG. 5. This diagram illustrates the case when the ratio between the processor clock and the bus clock is 2:1. The phases of the bus clock are indicated at the top of the diagram. In this case, the previous edge detector 50 (FIG. 5) receives a logic high valid_ratio signal, and the first AND gate 70 thus becomes responsive to bus_clk. Again, the flip-flops 74 and 76 are clocked by the falling edge of processor_clk. At an intermediate point of phase 2 of the bus clock, the falling edge of processor_clk clocks the flip-flops and the first flip-flop 74 latches a logic 0 from the bus_clk signal. On the next falling edge of processor_clk, which occurs at an intermediate point of phase 1 of the next bus clock, the second flip-flop 76 latches the previous 0 value from the first flip-flop 74, which then latches a logic 1 value from bus_clk. At this point, with outputs of 1 and 0 from flip-flops 74 and 76, respectively, the second AND gate 78 outputs a logic high previous_edge signal, as indicated in the third signal of FIG. 7. On the next falling edge of processor_clk, outputs 1 and 0 are no longer input to the AND gate 78, which causes previous_edge to go low again. The previous_edge signal represents the start of the bus clock cycle, except delayed by half the period of the processor clock, which goes low during an intermediate point when the bus clock is high.

Figure 8:
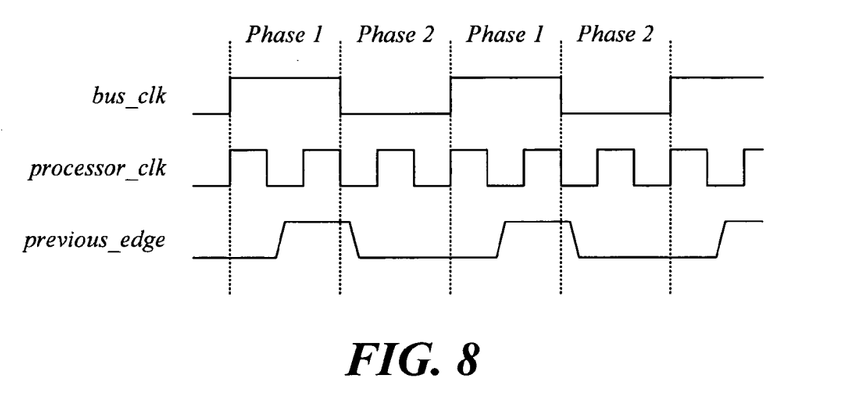
FIG. 8 is a timing diagram of exemplary signals present in the embodiment of FIG. 5 for a core-to-bus frequency ratio of 3:1.
Figure 9:
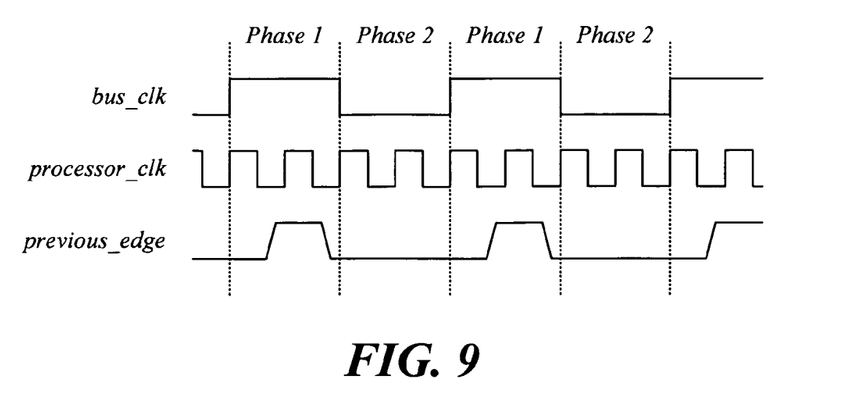
FIG. 9 is a timing diagram of exemplary signals present in the embodiment of FIG. 5 for a core-to-bus frequency ratio of 4:1.

FIG. 8 is a timing diagram of exemplary signals processed by or output from the previous edge detector 50 of FIG. 5. This diagram illustrates the case when the ratio between the processor clock and the bus clock is 3:1. The previous_edge signal is obtained in substantially the same way as that of the 2:1 arrangement described with respect to FIG. 7 except that the previous_edge signal is high for a third of the period of the bus clock. Also, FIG. 9 is a timing diagram illustrating the case when the ratio is 4:1. The previous_edge signal is also obtained in substantially the same way as with the 2:1 and 3:1 arrangements. In this case, the previous_edge signal is high for a fourth of the period of the bus clock.

Figure 10:
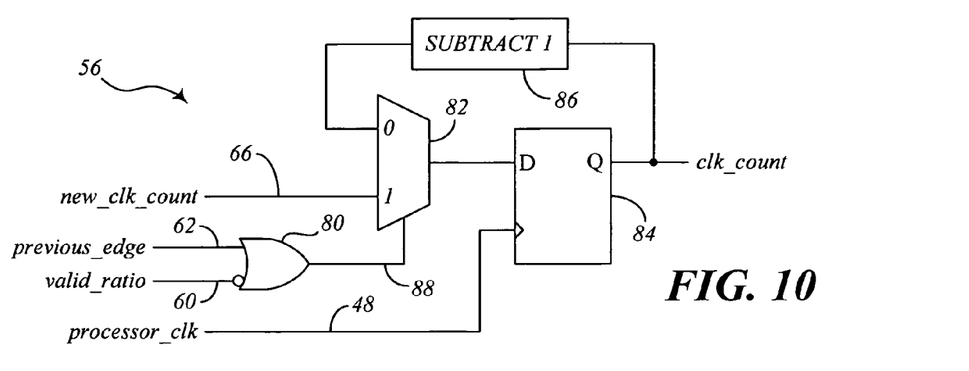
FIG. 10 is a schematic diagram of an embodiment of the clock counter shown in FIG. 4.

FIG. 10 is a schematic diagram of an embodiment of the clock counter 56 shown in FIG. 4. The clock counter 56 in this embodiment includes an OR gate 80, a multiplexer 82, a three-bit flip-flop 84, and a decrement, or "subtract 1", device 86. In a first case, when valid_ratio is 0, indicating a 1:1 ratio, the valid_ratio signal is inverted at the input of the OR gate 80, which then continually provides a logic 1 output along path 88 to a selection input of the multiplexer 82. The output of the OR gate 80 along path 88 is referred to herein as a "load_new_clk_count" signal, which indicates when the three-bit new clock count ("new_clk_count") from the combinational logic 54 (FIG. 4) is to be loaded. If the selection input is logic 1, the load_new_clk_count selects the "1" input of the multiplexer 82, which receives the new_clk_count signal. For the 1:1 ratio case, only the 1 input of the multiplexer 82 is selected and the three-bit flip-flop 84 therefore outputs only the new_clk_count signal as the three-bit clock count value ("clk_count") signal at the output of the clock counter 56.

In the case where the clock ratio is other than 1:1, the inverted valid_ratio of 1 at the input of the OR gate 80 does not drive this gate high. Therefore, the OR gate 80 follows the previous_edge signal. When previous_edge is high, the multiplexer 82 selects the 1 input, i.e. the new_clk_count signal, which is clocked into the flip-flop 84 on the leading edge of the processor clock. The output of the flip-flop 84 is the clk_count signal, which is also fed back to the decrement ("subtract 1") device 86, which, as the name suggests, subtracts one from the clock count value. If the three-bit value is 000, subtracting one will roll over or reset to binary 111. The output from the subtract 1 device 86 is input into the 0 input of the multiplexer 82. When previous_edge is 0, the 0 input of the multiplexer 82, representing the clk_count value subtracted by 1, is selected and loaded into the flip-flop 84. The subtracting loop continues with every processor_clk pulse until the previous_edge signal is 1 again. At this point, the new clock count is clocked into the counter.

Figure 11:
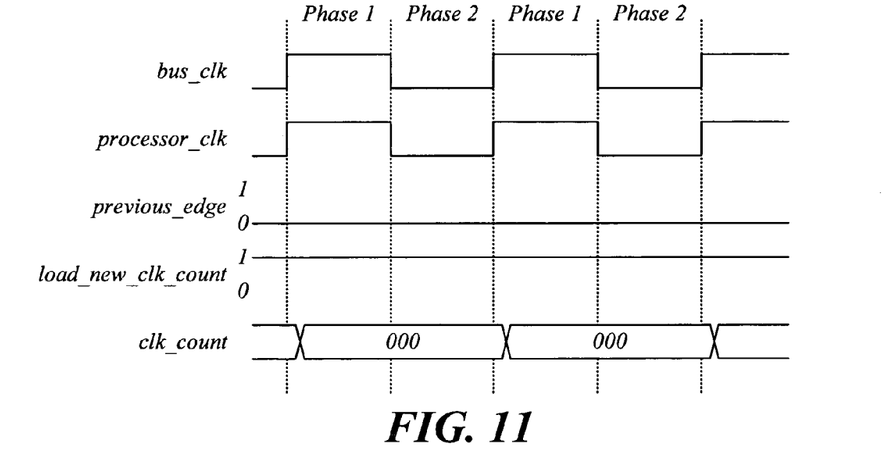
FIG. 11 is a timing diagram of exemplary signals present in the embodiments of FIGS. 5 and 10 for a core-to-bus frequency ratio of 1:1.

FIG. 11 is a timing diagram of the bus_clk, processor_clk, and previous_edge signals shown in FIG. 6, plus exemplary load_new_clk_count and three-bit clk_count signals generated by the clock counter 56 of FIG. 10. This diagram illustrates the case where the clock ratio is 1:1. As mentioned above, the load_new_clk_count signal will continually be high since valid_ratio is 0. The multiplexer 82 continually loads the new_clk_count value, which, for the 1:1 ratio (or divide by 1) as shown in the truth table above, is 000.

Figure 12:
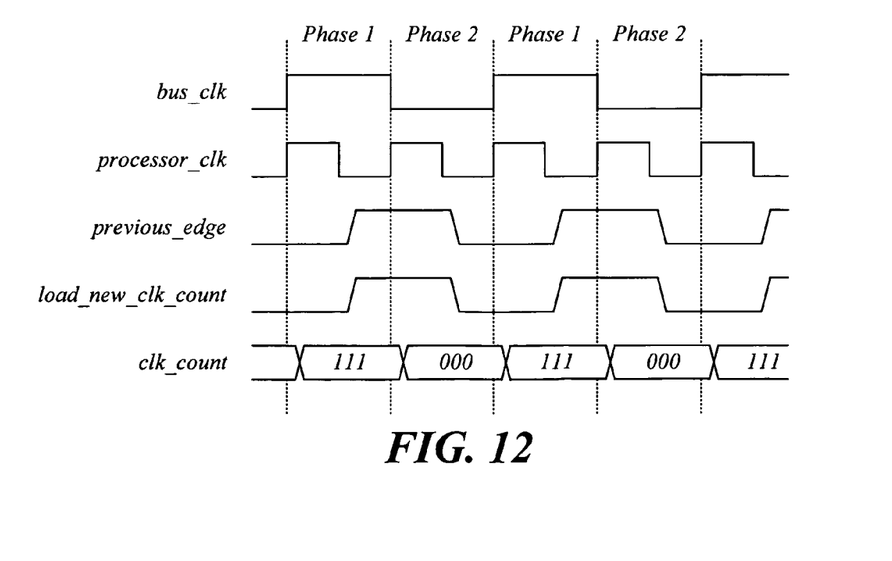
FIG. 12 is a timing diagram of exemplary signals present in the embodiments of FIGS. 5 and 10 for a core-to-bus frequency ratio of 2:1.

FIG. 12 is a timing diagram of the bus_clk, processor_clk, and previous_edge signals shown in FIG. 7, plus exemplary load_new_clk_count and clk_count signals generated by the clock counter 56 of FIG. 10. This diagram illustrates the case where the ratio is 2:1. The load_new_clk_count signal will be the same as the previous_edge signal since valid_ratio is high. At the rising edge of the processor clock, the flip-flop 84 loads in the new_clk_count when previous_edge is high. In this case of a 2:1 ratio, the new clock count is 000 (from the truth table above). At the next rising edge of the processor clock, the previous_edge signal will be low and the subtracted value (111) is loaded into the flip-flop 84. At the next rising edge, the previous_edge is high again and the new count of 000 is reloaded. Therefore, in the 2:1 situation, the clock count alternates between 000 and 111.

Figure 13:
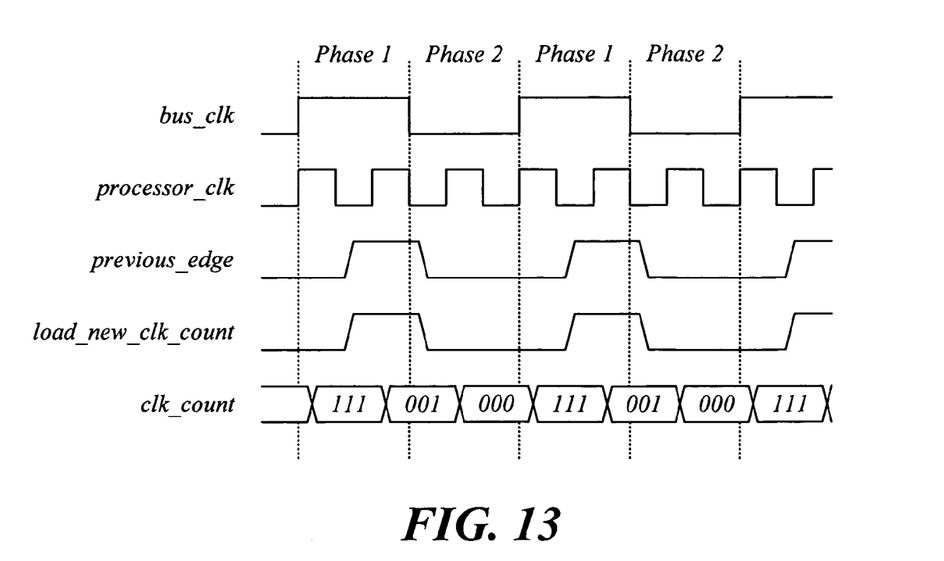
FIG. 13 is a timing diagram of exemplary signals present in the embodiments of FIGS. 5 and 10 for a core-to-bus frequency ratio of 3:1.

FIG. 13 is a timing diagram of the bus_clk, processor_clk, and previous_edge signals shown in FIG. 8, plus exemplary load_new_clk_count and clk_count signals generated by the clock counter 56 of FIG. 10. This diagram illustrates the case where the ratio is 3:1. In this example, when the previous_edge signal is high on the rising edge of processor_clk, the new clock count of 001 (form the truth table above) is loaded. The subtract 1 device 86 loops two times during the next two rising edges of processor_clk, whereby the second subtraction resets the value to 111. On the next rising edge, previous_edge and load_new_clk_count are high and 001 is reloaded. In the 3:1 situation, the clock count goes from 001 to 000 to 111 and then reloads and loops continuously.

Figure 14:
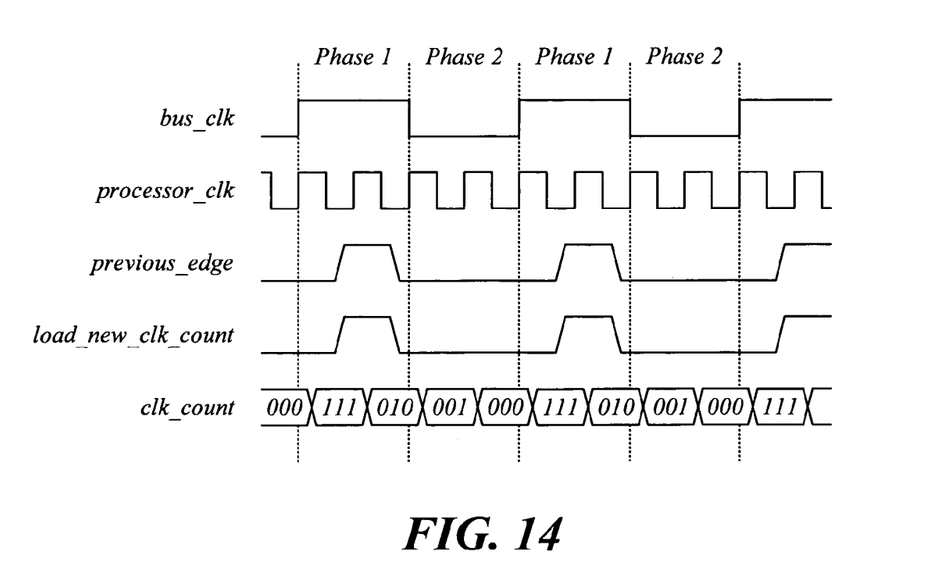
FIG. 14 is a timing diagram of exemplary signals present in the embodiments of FIGS. 5 and 10 for a core-to-bus frequency ratio of 4:1.

FIG. 14 is a timing diagram of the bus_clk, processor_clk, and previous_edge signals shown in FIG. 9, plus exemplary load_new_clk_count and clk_count signals generated by the clock counter 56 of FIG. 10. This diagram illustrates the case where the valid_ratio is 4:1. This diagram is similar to FIG. 13 in that the loaded count signal is counted down and rolls over to 111 before it is reloaded again. The progression of clock counts is 010, 001, 000, and 111, which loops continually.

Although only the 1:1, 2:1, 3:1, and 4:1 ratios are explained herein, it should be recognized that any clock ratio from 1:1 up to 8:1 may be used in accordance with the present description. However, it should also be recognized that if the count value contains one extra bit, then any ratio up to 16:1 may be synchronized. In this alternative embodiment, certain modifications to the circuitry can be made in accordance with the present description. For example, the combinational logic 54 shown in the FIG. 4 can be modified to output a four-bit new_clk_count value to the clock counter 56.

Referring back to FIG. 4, the operation of the flag generating circuit 58 will now be explained. In response to the three-bit clock count (clk_count) at the output of the clock counter 56, the flag generating circuit 58 processes this clock count to create a flag signal. The flag signal, referred to herein as the "clk_edge_flag" signal, is output along path 68. The clk_edge_flag signal indicates the start of a new bus clock cycle. The flag signal is comparable to the control signal of the prior art, except for the fact that it is created relative to the leaf location. The flag generating circuit 58 analyzes the clock count value (clk_count) and outputs a high signal for clk_edge_flag when clk_count is 000.

Figure 15:
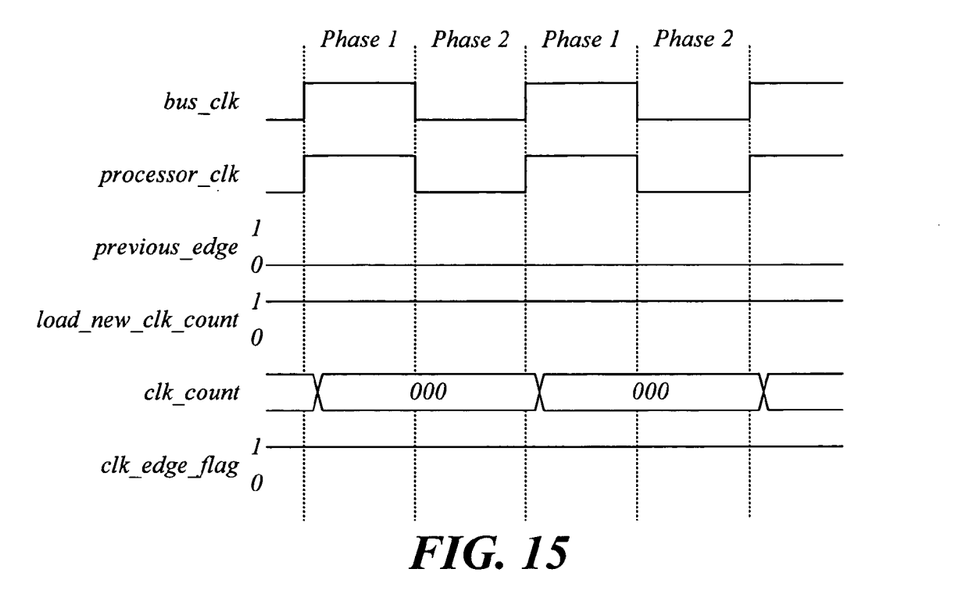
FIG. 15 is a timing diagram of an exemplary clock edge flag signal for a core-to-bus ratio of 1:1.
Figure 16:
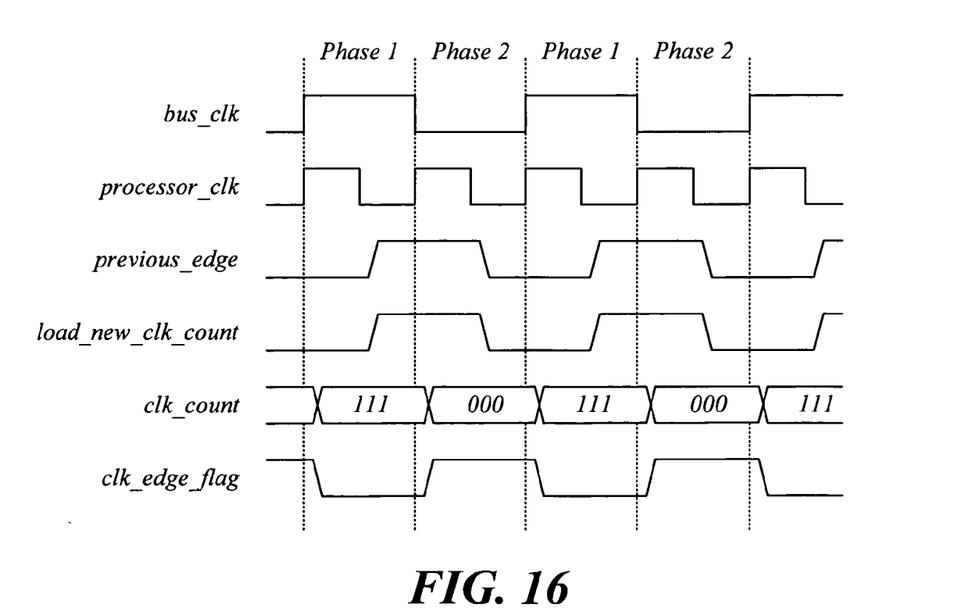
FIG. 16 is a timing diagram of an exemplary clock edge flag signal for a core-to-bus ratio of 2:1.
Figure 17:
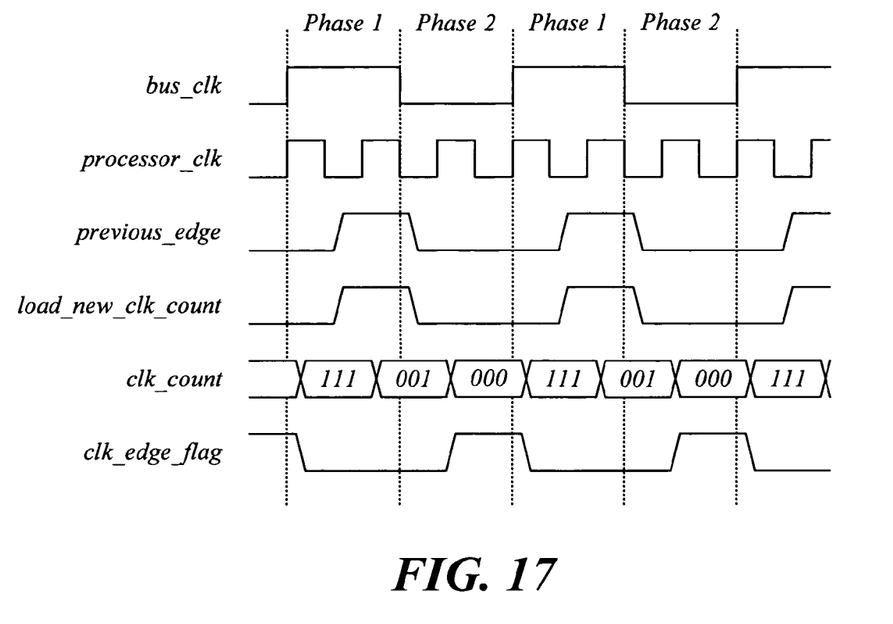
FIG. 17 is a timing diagram of an exemplary clock edge flag signal for a core-to-bus ratio of 3:1.
Figure 18:
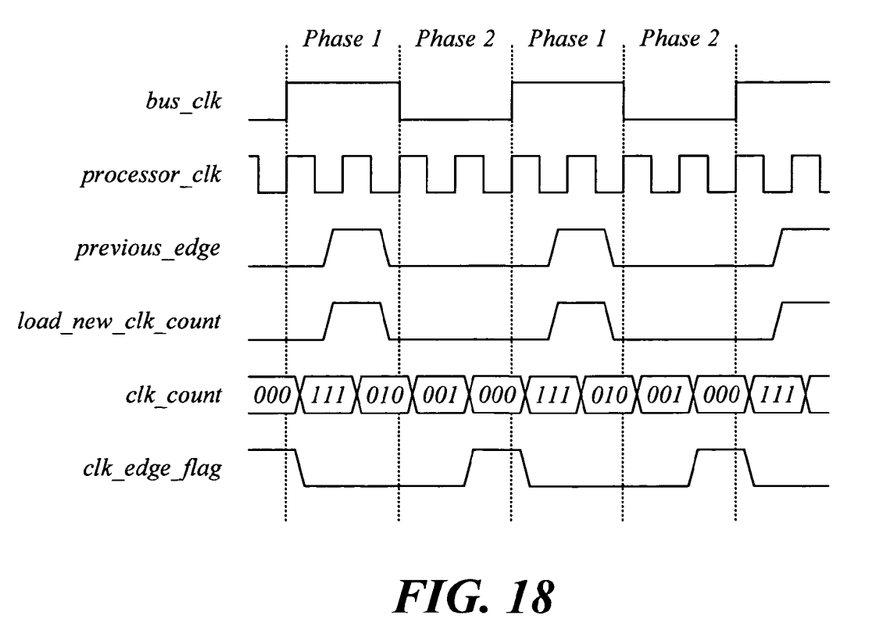
FIG. 18 is a timing diagram of an exemplary clock edge flag signal for a core-to-bus ratio of 4:1.

FIG. 15 is timing diagram showing the signals from FIG. 11 plus an exemplary clk_edge_flag signal. In this example, since the clk_count signal is continually 000, the flag generating circuit 58 generates a clk_edge_flag signal that is held high continuously, as shown. FIGS. 16-18 are timing diagrams showing signals from FIGS. 12-14, respectively, plus exemplary clk_edge_flag signals. Again, the clk_edge_flag signals in these figures are logic 1 when clk_count is 000.

It should be noted that this clk_edge_flag indicates the start of the new clock cycle for the insertion-delayed (or leaf) bus clock, regardless of the clock ratio. It may be recognized that this flag signal is similar to the ideal control signal of the prior art. However, instead of relying on a control signal that may experience delays that require additional manual re-design, the flag signal of the present application is created from the leaf bus clock and leaf processor clock. Therefore, regardless of the clock insertion delay, the bus clock edge detector 38 is capable of automatically detecting the leading edge of the next bus clock without the need to provide additional specially-designed delay circuitry for a root control signal. With the location of the leading edge of the bus clock known, the processor may be managed to communicate in synchronization with this edge. In this way, the processor clock can be substantially synchronized with the bus clock.

Figure 19:
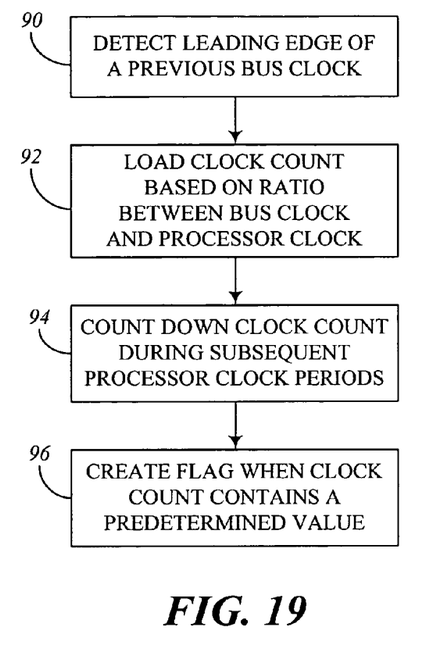
FIGS. 19-21 are flow charts illustrating embodiments of process functionality for synchronizing a processor clock with the leading edge of a bus clock.
Figure 20:
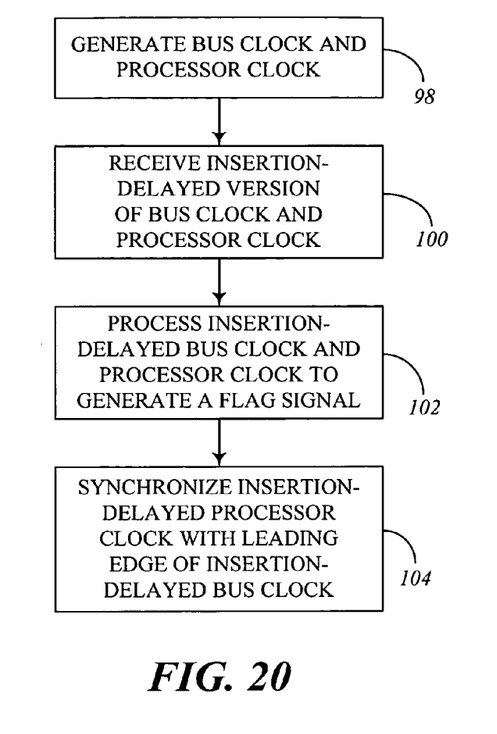
Figure 21:
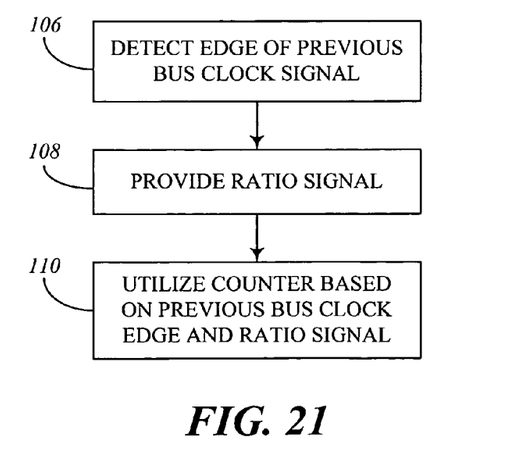

FIGS. 19-21 include flow charts related to methods for synchronizing a processor clock with the leading edge of a bus clock. These methods may be performed by the corresponding components described with respect to FIGS. 3-5 and 10, as described above, or may be performed by other suitable components or modules having similar functionality as described with respect to these flow charts.

FIG. 19 is a flow chart illustrating a method for creating a flag signal, which indicates the location of a leading edge of a bus clock. In one embodiment, this method may be used to synchronize a processor clock with the detected location of the leading edge of the bus clock. In the embodiment of FIG. 19, the process begins by detecting a leading edge of a previous bus clock, as indicated in block 90. Upon detection of the leading edge of the previous bus clock, the process may create or provide a "previous_edge" signal. In block 92, the process includes loading a clock count based on a ratio between the bus clock and the processor clock. The processor clock, for example, may be an integer multiple of the bus clock. Also, the clock count may be loaded when the previous_edge signal is high. In block 94, the clock count is counted down during subsequent processor clock periods. In block 96, the process includes creating a flag when the clock count contains a predetermined value. In one embodiment, a bus clock edge detector located in a processor may perform the process illustrated in the flow chart of FIG. 19.

FIG. 20 is a flow chart illustrating another embodiment of a method or process performed according to the teachings of the present disclosure. In block 98, the process generates a bus clock and a processor clock. More particularly, these clock signals, for example, are preferably generated without the prior art control signal since a control signal would normally not be necessary in this implementation. In block 100, the process receives an insertion-delayed version of the bus clock and processor clock. The insertion delay may become evident as a result of the inclusion of a clock tree or other delay-inducing components in a clocking system. In block 102, the insertion-delayed bus clock and processor clock are processed so as to generate a flag signal. The flag signal indicates the location of a leading edge of the insertion-delayed bus clock. In a further embodiment, the processing of the insertion-delayed bus clock and processor clock (block 102) may be accomplished by the method described with respect to FIG. 21 as discussed below. Still referring to FIG. 20, the process may synchronize the insertion-delayed processor clock with the leading edge of the insertion-delayed bus clock, as indicated in block 104.

FIG. 21 is a flow chart illustrating an alternative embodiment for performing the functions described with respect to block 102. In this embodiment, block 106 includes detecting an edge of a previous bus clock signal. In block 108, the process provides a ratio signal, which indicates the ratio of the frequency of the processor clock with respect to the frequency of the bus clock. In block 110, the process utilizes a counter, which is responsive to both a previous bus clock edge and the ratio signal. The flag signal may be generated based on a count value provided by the counter.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

I claim:

1. A circuit for indicating the location of a leading edge of a bus clock, the circuit comprising:
   a clock ratio controller configured to generate a clock_ratio signal indicating the ratio of the frequency of a processor clock to the frequency of a bus clock and a valid_ratio signal indicating whether or not the clock_ratio signal is 1:1, the frequency of the processor clock being an integer multiple of the frequency of the bus clock;
   a previous edge detector for detecting a leading edge of a previous bus clock cycle, the previous edge detector configured to receive the valid_ratio signal, the bus clock, and the processor clock at a leaf of a clock tree, the previous edge detector further configured to generate a previous_edge signal according to the received valid_ratio signal, bus clock, and processor clock;
   combinational logic configured to receive the clock_ratio signal, the combinational logic further configured to generate a new_clock_count signal according to the received clock_ratio signal;
   a clock counter configured to receive the processor clock, the previous_edge signal, the valid_ratio signal, and the new_clock_count signal, the clock counter further configured to generate a clk_count signal according to the received processor clock, previous_edge signal, valid_ratio signal, and new_clock_count signal; and
   a flag generating circuit configured to process the clk_count signal and generate a clk_edge_flag signal indicative of the location of the leading edge of the next bus clock cycle.

2. The circuit of claim 1, wherein the previous edge detector comprises:
   a first AND gate configured to receive the bus clock at one input and the valid_ratio signal at another input;
   a first flip-flop configured to receive an output from the first AND gate;
   a second flip-flop configured to receive an output from the first flip-flop; and
   a second AND gate configured to receive a non-inverted output from the first flip-flop and an inverted output from the second flip-flop, the second AND gate further configured to generate the previous_edge signal according to the received non-inverted output from the first flip-flop and the inverted output from the second flip-flop.

3. The circuit of claim 2, wherein the previous edge detector further comprises:
   an inverter configured to invert the processor clock, whereby the first and second flip-flops are clocked by the inverted processor clock.

4. The circuit of claim 1, wherein the clock counter comprises:
   an OR gate configured to receive the previous_edge signal at one input and an inverted version of the valid_ratio signal at another input;
   a multiplexer having a selection input responsive to the output of the OR gate;
   a flip-flop configured to receive the output of the multiplexer, the flip-flop clocked by the processor clock, the flip-flop further configured to provide the clk_count signal according to the received output of the multiplexer; and
   a decrement device configured to subtract from the clk_count signal;
   wherein the multiplexer is configured to receive the subtracted clk_count signal at a first input and the new_clock_count signal at a second input.

5. The circuit of claim 1, wherein the clk_count signal has a value that is defined by one or more bits.

6. The circuit of claim 5, wherein the clk_count signal has a value that is defined by three or more bits.

7. A clocking system comprising:
   a centralized clock control circuit for providing a bus clock and a processor clock, the processor clock being an integer multiple of the bus clock, wherein the centralized clock control circuit does not provide a control signal that indicates the location of an edge of the bus clock;
   a clock tree configured to distribute the bus clock and processor clock to multiple destinations, whereby the destinations receive the bus clock and processor clock delayed by an insertion time of the clock tree; and
   a processor comprising a bus clock edge detector for detecting the leading edge of the bus clock delayed by the insertion time.

8. The clocking system of claim 7, wherein the bus clock edge detector further comprises a previous edge detector for detecting an edge of a previous bus clock signal delayed by the insertion time.

9. The clocking system of claim 8, wherein the previous edge detector further comprises:
   a first flip-flop for providing a current bus clock state;
   a second flip-flop for providing a previous bus clock state; and
   an AND gate for determining a bus clock transition based on the previous bus clock state and the current bus clock state.

10. The clocking system of claim 9, wherein the previous edge detector further comprises:
    an inverter for clocking the first flip-flop and the second flip-flop on a non-active edge of the processor clock.

11. The clocking system of claim 7, wherein the bus clock edge detector further comprises a clock counter for generating a count signal.

12. The clocking system of claim 11, wherein the clock counter further comprises:
    a flip-flop for outputting the count signal;
    a decrement device for subtracting from the outputted count signal;
    an OR gate for indicating when to load a new count signal; and
    a multiplexer for selecting from the subtracted count signal or the new count signal.

13. The clocking system of claim 12, wherein the multiplexer makes a selection based on an edge of a previous bus clock signal delayed by the insertion time and a ratio between the bus clock and the processor clock.

14. The clocking system of claim 7, wherein the bus clock edge detector further comprises a flag generating circuit for providing a flag that indicates the location of the leading edge of the next bus clock.

15. The clocking system of claim 14, wherein the processor is configured to synchronize data communication with a peripheral device in response to the flag.

16. A method for creating a flag that indicates the location of the leading edge of the bus clock, the method comprising:

detecting a leading edge of a previous bus clock to provide a previous_edge signal;

loading a clock count based on a ratio between a bus clock and a processor clock, the clock count being loaded at least when the previous_edge signal is high;

counting down the clock count during subsequent processor clock periods; and creating a flag when the clock count contains a predetermined value.

17. The method of claim 16, wherein the processor clock is an integer multiple of the bus clock.

18. A method comprising:

generating a bus clock and a processor clock without a corresponding control signal;

receiving an insertion-delayed version of the bus clock and processor clock; and processing the insertion-delayed bus clock and processor clock to generate a flag signal that indicates the location of a leading edge of the insertion-delayed bus clock.

19. The method of claim 18, further comprising:

synchronizing the insertion-delayed processor clock with the leading edge of the insertion-delayed bus clock.

20. The method of claim 18, wherein processing the insertion-delayed bus clock and processor clock further comprises:

detecting an edge of a previous bus clock signal;

providing a ratio signal indicative of a ratio of the frequency of the processor clock to the frequency of the bus clock; and utilizing a counter based on the previous bus clock edge and the ratio signal;

wherein the flag signal is generated based on a count value from the counter.

* * * * *